United States Patent
Usui et al.

(10) Patent No.: US 6,939,819 B2
(45) Date of Patent: Sep. 6, 2005

(54) GLASS CERAMIC COMPOSITION

(75) Inventors: Hiroshi Usui, Kanagawa (JP); Hitoshi Onoda, Kanagawa (JP); Kazunari Watanabe, Kanagawa (JP); Yumi Okuyama, Kanagawa (JP); Yasuko Osaki, Kanagawa (JP); Katsuyoshi Nakayama, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 80 days.

(21) Appl. No.: 10/463,697

(22) Filed: Jun. 18, 2003

(65) Prior Publication Data

US 2003/0228968 A1 Dec. 11, 2003

Related U.S. Application Data

(63) Continuation of application No. PCT/JP02/07625, filed on Jul. 26, 2002.

(30) Foreign Application Priority Data

Nov. 5, 2001 (JP) ......................................... 2001-339575

(51) Int. Cl.$^7$ ............................................. C03C 14/00
(52) U.S. Cl. ............................. 501/32; 501/66; 501/67; 501/70; 501/72; 501/73; 501/77; 501/79
(58) Field of Search .............................. 501/32, 65, 66, 501/67, 69, 70, 73, 77, 79

(56) References Cited

U.S. PATENT DOCUMENTS

| | | | | |
|---|---|---|---|---|
| 4,788,046 A | * | 11/1988 | Barringer et al. | 264/661 |
| 5,212,121 A | | 5/1993 | Omata et al. | |
| 5,342,674 A | * | 8/1994 | Tanei et al. | 428/209 |
| 5,372,976 A | * | 12/1994 | Matsumoto et al. | 501/32 |
| 5,747,396 A | | 5/1998 | Miyakoshi et al. | |
| 5,763,343 A | * | 6/1998 | Brix et al. | 501/67 |
| 5,817,586 A | * | 10/1998 | Harada et al. | 501/17 |
| 6,043,604 A | * | 3/2000 | Horiuchi et al. | 313/582 |
| 6,376,055 B1 | | 4/2002 | Kishida et al. | |
| 2001/0029228 A1 | * | 10/2001 | Terashi | 501/32 |

FOREIGN PATENT DOCUMENTS

| | | |
|---|---|---|
| JP | 7-157363 | 6/1995 |
| JP | 10-7435 | 1/1998 |
| JP | 10-120436 | 5/1998 |
| JP | 10-167757 | 6/1998 |
| JP | 10-251042 | 9/1998 |
| JP | 10-330168 | 12/1998 |
| JP | 2000-16837 | 1/2000 |
| JP | 2001-348268 | 12/2001 |

OTHER PUBLICATIONS

Kingery et al., Introduction to Ceramics, pp. 307–308, 1976.*

* cited by examiner

*Primary Examiner*—David Sample
(74) *Attorney, Agent, or Firm*—Oblon, Spivak, McClelland, Maier & Neustadt, P.C.

(57) ABSTRACT

A glass ceramic composition which consists essentially of an inorganic material powder having a melting point or a glass transition point of at least 1,000° C. and a glass powder having a glass transition point of from 450 to 800° C., wherein the average of the major axes L of particles of the above inorganic material powder is from 0.5 to 15 μm, and the average of the ratios L/W of the major axes L to the minor axes W is at most 1.4. Further, a glass ceramic composition which consists essentially of, as represented by mass percentage, from 10 to 58% of an inorganic material powder having a melting point or a glass transition point of at least 1,000° C. and from 42 to 90% of a glass powder having a glass transition point of from 450 to 800° C., wherein the glass powder consists essentially of, as represented by mol %, $SiO_2$: 35 to 70%, $B_2O_3$: 0 to 30%, $Al_2O_3$: 3 to 18%, MgO: 0 to 40%, CaO: 0 to 19%, BaO: 0 to 35% and ZnO: 0 to 9%.

23 Claims, No Drawings

GLASS CERAMIC COMPOSITION

TECHNICAL FIELD

The present invention relates to a glass ceramic composition suitable for preparation of an electronic circuit board by calcination.

BACKGROUND ART

Heretofore, an alumina substrate prepared by sintering an alumina powder has been widely used as an electronic circuit board.

For the above alumina substrate, since the alumina powder has a high sintering temperature of about 1,600° C., only a high melting point metal such as tungsten (melting point: 3,400° C.) or molybdenum (melting point: 2,620° C.) can be used as a material of an electrode which is calcined simultaneously with preparation of the alumina substrate. Accordingly, a non-high melting point metal such as silver (melting point: 962° C.) having a small resistivity but having a melting point of at most 1,600° C. can not be used as a material of the above electrode, such being problematic.

In recent years, a material for an electronic circuit board with which an electronic circuit board can be prepared by calcination at a temperature of at most 900° C., as the alternative to the above alumina powder, has been required.

It is an object of the present invention to overcome the above problems, and to provide a glass ceramic composition suitable for preparation of an electronic circuit board.

DISCLOSURE OF THE INVENTION

The present invention provides a glass ceramic composition which consists essentially of an inorganic material powder having a melting point or a glass transition point of at least 1,000° C. and a glass powder having a glass transition point of from 450 to 800° C., wherein the average of the major axes L of particles of the above inorganic material powder is from 0.5 to 15 μm, and the average of the ratios L/W of the major axes L to the minor axes W is at most 1.4 (first invention).

The present invention further provides glass a ceramic composition which consists essentially of, as represented by mass percentage, from 10 to 58% of an inorganic material powder having a melting point or a glass transition point of at least 1,000° C. and from 42 to 90% of a glass powder having a glass transition point of from 450 to 800° C., wherein the glass powder consists essentially of, as represented by mol % based on the following oxides, $SiO_2$: 35 to 70%, $B_2O_3$: 0 to 30%, $Al_2O_3$: 3 to 18%, MgO: 0 to 40%, CaO: 0 to 19%, BaO: 0 to 35% and ZnO: 0 to 9% (second invention).

BEST MODE FOR CARRYING OUT THE INVENTION

When a glass ceramic composition of the present invention (hereinafter referred to as the composition of the present invention) is used for preparation of an electronic circuit board, usually it is formed into a green sheet. Namely, to the composition of the present invention, a resin such as polyvinyl butyral or an acryl resin, and further, e.g. a plasticizer such as dibutyl phthalate, dioctyl phthalate or butylbenzyl phthalate as the case requires are added, followed by mixing. Then, a solvent such as toluene, xylene or butanol is added thereto to prepare a slurry, and this slurry is formed into a sheet on a film of e.g. polyethylene terephthalate (PET) by means of e.g. doctor blade method. Finally, the product formed into a sheet is dried to remove the solvent, whereby a green sheet is obtained. This green sheet is subjected to a calcination step of holding it typically at from 800 to 900° C. or from 900 to 950° C. for from 5 to 180 minutes, more typically at 850° C. to 900° C. for from 5 to 150 minutes, to obtain an electronic circuit board.

The method for preparing the above slurry is not limited to the above method of mixing the glass ceramic composition with a resin and e.g. a plasticizer as the case requires, and then adding a solvent thereto. For example, it is preferred that after a resin and a solvent are mixed, the glass ceramic composition and e.g. a plasticizer as the case requires are added thereto, followed by mixing to obtain a slurry, or after the glass ceramic composition and a solvent are mixed, and a resin and e.g. a plasticizer as the case requires are added thereto, followed by mixing to obtain a slurry.

The relative dielectric constant $\epsilon$ of a calcined product obtained by calcining the composition of the present invention at 900° C., at 20° C. at 35 GHz is preferably at most 8.6. It is more preferably at most 7.8. Further, $\epsilon$ is typically at least 4. The above time of holding the composition of the present invention at 900° C. is typically from 30 to 60 minutes.

Further, the dissipation loss tan δ of the above calcined product at 20° C. at 35 GHz is preferably at most 0.0030. It is more preferably at most 0.0019. Tan δ is typically at least 0.0010.

Further, the transmission loss S21 of the above calcined product at 20° C. at 40 GHz is preferably at most 0.08 dB/mm. If it exceeds 0.08 dB/mm, it may not be used for an electronic circuit board for high frequency. It is more preferably at most 0.05 dB/mm. S21 of an alumina substrate (96% alumina) is 0.05 dB/mm.

The above S21 is one of elements of a scattering matrix (S matrix), and represents transparency loss property of a circuit. The S matrix is a square matrix of complex number which consists of a transmission coefficient and a reflection coefficient of a circuit and which defines circuit characteristics.

S21 is obtained, for example, by forming a microstrip line designed so that the characteristic impedance will be 50 Ω on a board made of the above calcined product, followed by measurement by using a network analyzer.

The microstrip line is such that a conductor transmission line is formed on the upper side of the board, and a ground conductor is formed on the lower side of the board, and the characteristic impedance is determined by the thickness of the board, the relative dielectric constant of the board i.e. the above $\epsilon$, the thickness of the conductor transmission line, the electric conductivity of the conductor transmission line and the width of the conductor transmission line. Adjustment of the characteristic impedance to 50 Ω is carried out finally by adjustment of the width of the conductor transmission line.

For the conductor transmission line and the ground conductor, a conductor such as silver is employed.

The typical shape or dimension of the microstrip line for measurement of the above S21 is as follows. Namely, of the board, the length is 30 mm, the width is 6 mm and the thickness is 0.254 mm, and of the conductor transmission line, the length is 20 mm, the width is 295 μm and the thickness is 7 μm.

S21 is obtained by measuring the amplitude ratio or the phase difference of the incident wave to the reflected wave or the transmitted wave of the microstrip line by means of a network analyzer such as network analyzer 8510 manufactured by Agilent Technologies, and analyzing the results.

For measurement of S21 of the present invention, S21 is obtained by calibrating the S matrix by TRL calibration method. Namely, influences of e.g. the loss due to a detector or a cable are corrected with respect to the S matrix for each frequency to obtain S21.

The TRL calibration method is a calibration method by means of "Thru" having terminals for calibration directly connected, "Reflect" having terminals for calibration not connected and having waves reflected on each terminal part, and "Line" having a standard having an appropriate transmission line formed thereon connected between terminals, and is a calibration method suitable for high-frequency measurement.

Now, components in the glass ceramic composition according to the first invention (hereinafter referred to as the composition of the first invention) will be explained. The content is represented by mass percentage.

The inorganic material powder having a melting point or a glass transition point of at least 1,000° C. (hereinafter referred to as fire resisting powder) is a component to increase strength of a calcined product and is essential.

In order to lower tan δ of a calcined product, the fire resisting powder is preferably a powder of at least one type of an inorganic material selected from the group consisting of α-alumina (melting point: 2,050° C.), cordierite (melting point: 1,460° C.), forsterite (melting point: 1,890° C.), enstatite (melting point: 1,550° C.) and spinel (melting point: 2,050° C.). It is more preferred that an α-alumina powder is contained.

The average $L_{AV}$ of the major axes L of particles of the fire resisting powder is from 0.5 to 15 μm. If it is less than 0.5 μm, strength of the calcined product tends to decrease. It is preferably at least 0.7 μm, more preferably at least 1 μm. If it exceeds 15 μm, the degree of mixing decreases, whereby strength of the sintered product tends to decrease, ε tends to be high, or it tends to be difficult to fabricate the green sheet precisely.

In e.g. a case where ε has to be further lower, $L_{AV}$ is preferably at most 9 μm, more preferably at most 6 μm.

If the composition of the first invention is formed into a green sheet, and a conductor such as silver is formed on the surface, followed by calcination, since sintering shrinkage behaviors of the green sheet and the burning shrinkage behaviors of the conductor are different, deformation such as warpage may form on the calcined product. In a case where such a deformation has to be more suppressed, $L_{AV}$ is preferably at least 9 μm.

The average $\Psi_{AV}$ of the ratios L/W of the major axes L to the minor axes W of particles of the fire resisting powder is at most 1.4. If it exceeds 1.4, the denseness i.e. sintering properties of the calcined product tend to decrease, whereby tan δ of the calcined product tends to be high, in a case where crystals are precipitated from a glass powder having a glass transition point of from 450 to 800° C. (hereinafter referred to as low-melting glass powder) as another component of the composition of the first invention at the time of calcination. Further, in a case where no crystals are precipitated from the low-melting glass powder at the time of calcination, strength of the calcined product tends to decrease. $\Psi_{AV}$ is preferably at most 1.3, more preferably at most 1.25.

The above L, $L_{AV}$, W and $\Psi_{AV}$ are measured or calculated as follows.

First, the fire resisting powder is spread on a stage of a scanning electron microscope (SEM). Here, a fixing agent such as colorless nail lacquer (manicure) is preliminarily coated on the stage so as to fix the particles. In a case where the particles on the stage are agglomerated, they are dispersed by means of a soft brush, and then particles which are not fixed on the stage are blown away by means of e.g. a rubber blower.

Then, the particles on the stage are observed by a SEM to measure L and W. Namely, a particle which can be observed without being blocked by another particle is selected, and the shortest distance of two parallel lines which sandwich the image of the particle is taken as W, and the distance of two parallel lines which cross at right angles with the above two parallel lines and which sandwich the image is taken as L.

This measurement is carried out with respect to at least 20 particles, and the average $L_{AV}$ of L and the average $\Psi_{AV}$ of L/W are calculated.

The ratio $D_{90}/D_{10}$ of the 90% particle diameter $D_{90}$ to the 10% particle diameter $D_{10}$ of the fire resisting powder is preferably at most 5. If it exceeds 5, sintering properties of the calcined product tend to decrease, whereby strength of the calcined product tends to decrease, or tan δ of the calcined product tends to be high. It is more preferably at most 3. Here, $D_{90}$ and $D_{10}$ may be measured by means of e.g. a laser diffraction type particle size analyzer.

The content of the fire resisting powder is preferably from 10 to 60%. If it is less than 10%, strength of the calcined product tends to decrease. It is more preferably at least 15%. If it exceeds 60%, the sintering properties tends to decrease, thus decreasing strength of the calcined product on the contrary. It is more preferably at most 55%. In a case where no crystals are precipitated from the low-melting glass powder at the time of calcination, the content of the fire resisting powder is preferably at least 30%.

The low-melting glass powder is a component to improve denseness of the calcined product and is essential.

The average particle diameter $D_{50}$ of the low-melting glass powder is preferably from 0.5 to 10 μm. If it is less than 0.5 μm, storage stability tends to decrease. If it exceeds 10 μm, sintering properties tend to decrease.

The glass transition point $T_G$ of the low-melting glass powder is at most 800° C., whereby a dense calcined product can be obtained even by calcining the composition of the first invention at a temperature of 900° C. or below. $T_G$ is preferably at most 760° C., more preferably at most 730° C.

Further, the above $T_G$ is at least 450° C., whereby fluidity will not be excessive even when the composition of the present invention is calcined at 900° C., and a desired calcined product will be obtained. $T_G$ is preferably at least 550° C.

The relative dielectric constant $\epsilon_0$ of a calcined product obtained by calcining the low-melting glass powder at 900° C., at 20° C. at 35 GHz is preferably at most 8. Further, $\epsilon_0$ is typically at least 4. Here, the time of holding the low-melting glass powder at 900° C. is typically from 30 to 60 minutes.

Further, the dissipation loss $\tan \delta_0$ of the above calcined product at 20° C. at 35 GHz is preferably at most 0.0070. It is more preferably at most 0.0055, particularly preferably at most 0.0030. Further, $\tan \delta_0$ is typically at least 0.0010.

It is preferred that the low-melting glass powder consists essentially of, as represented by mol % based on the following oxides:

| | |
|---|---|
| $SiO_2$ | 20 to 72%, |
| $B_2O_3$ | 0 to 30%, |
| $Al_2O_3$ | 0 to 20%, |
| MgO + CaO | 0 to 60%, |
| SrO + BaO | 0 to 40%, |
| ZnO | 0 to 30%, |
| $Li_2O + Na_2O + K_2O$ | 0 to 10%, |
| $TiO_2 + ZrO_2$ | 0 to 5%, and |
| $SnO_2$ | 0 to 5%, | and $SiO_2+B_2O_3$ is at least 30% (glass powder A). Here, in e.g. a case where the expansion coefficient of the above calcined product has to be low, SrO+BaO is preferably from 0 to 20%.

Hereinafter, the content of each component of the low-melting glass powder is represented by mol %.

In a more preferred embodiment, $SiO_2$: over 55 to 72%, $B_2O_3$: 5 to 30%, $Al_2O_3$: 0 to 10% and MgO+CaO: 0 to 10% (glass powder A1). The glass powder A1 is particularly preferably such that no crystals are precipitated when calcined at 900° C., or the amount is small even if crystals are precipitated. Typically, of a calcined product thereof, $\epsilon_0$ is from 3 to 6 and tan $\delta_0$ is from 0.0010 to 0.0040.

In another more preferred embodiment, $SiO_2$: 35 to 60%, $B_2O_3$: 0 to 10%, $Al_2O_3$: 5 to 18%, MgO: 5 to 40%, CaO: 7 to 40% and ZnO: 0 to 10% (glass powder A2). The glass powder A2 is particularly preferably such that crystals are precipitated when calcined at 900° C. Further, typically, of a calcined product thereof, $\epsilon_0$ is from 5 to 9 and tan $\delta_0$ is from 0.0050 to 0.0100. Here, it becomes possible to improve strength of the calcined product by crystal precipitation.

The above precipitated crystals are preferably of at least one member selected from the group consisting of anorthite, cordierite, diopside, enstatite and forsterite.

In a case where the average coefficient of linear expansion $\alpha_0$ of the calcined product at from 50 to 350° C. is set to be at most $80 \times 10^{-7}$/° C. for example, the above precipitated crystals are more preferably of anorthite or cordierite.

In a case where tan $\delta_0$ of the calcined product has to be further smaller, the above precipitated crystals are more preferably of at least one member selected from the group consisting of cordierite, diopside, enstatite and forsterite.

In another more preferred embodiment, $SiO_2$: 20 to 60%, $B_2O_3$: 0 to 20%, $Al_2O_3$: 2 to 20% and MgO: 10 to 50% and CaO: 0 to 20% (glass powder A3) $SiO_2$ is particularly preferably at most 55%.

The glass powder A3 is particularly preferably such that crystals are precipitated when calcined at 900° C. Typically, of a calcined product thereof, $\epsilon_0$ is from 6 to 9 and tan $\delta_0$ is from 0.0030 to 0.0100. Here, it becomes possible to improve strength of the calcined product by crystal precipitation.

In a case where $\alpha_0$ has to be high or in a case where tan $\delta_0$ has to be small, the above precipitated crystals are preferably of at least one member selected from the group consisting of diopside, enstatite, forsterite and gahnite, and in a case where $\alpha_0$ has to be at most $80 \times 10^{-7}$/° C. for example, the above precipitated crystals are more preferably of anorthite or cordierite.

Now, the composition of the above glass powder A will be explained.

$SiO_2$ is a network former and is essential. If it is less than 20%, vitrification is less likely to take place, $\epsilon_0$ tends to be high, or chemical durability tends to decrease. It is preferably at least 60% with respect to the glass powder A1, at least 40% with respect to the glass powder A2 or at least 25% with respect to the glass powder A3. If it exceeds 72%, the glass melt temperature tends to be high, or $T_G$ tends to be high. It is preferably at most 67% with respect to the glass powder A1, and with respect to the glass powder A2, preferably at most 55%, more preferably at most 50%, particularly preferably less than 45%.

$B_2O_3$ is not essential, but may be contained up to 30% in order to increase fluidity or in order to lower $\epsilon_0$. If it exceeds 30%, chemical durability tends to decrease, or the viscosity of the slurry tends to be unstable when the composition is formed into a green sheet. It is preferably at most 25%.

In a case where crystals are precipitated when the glass powder is calcined at 900° C., $B_2O_3$ is preferably at most 20%. If it exceeds 20%, tan $\delta_0$ tends to be high. It is more preferred that no $B_2O_3$ is contained substantially.

If the total of $SiO_2$ and $B_2O_3$ is less than 30%, glass tends to be unstable.

$Al_2O_3$ is not essential, but may be contained up to 20% in order to stabilize glass or in order to increase the chemical durability. If it exceeds 20%, $T_G$ tends to be high. It is preferably at most 8% with respect to the glass powder A1. Here, in the glass powder A2, $Al_2O_3$ is a constituent of cordierite and anorthite and is essential, and it is preferably at least 7%. Further, in the glass powder A3, $Al_2O_3$ is essential to stabilize glass.

Each of MgO and CaO is not essential, but may be contained up to 60% in total, in order to stabilize glass, in order to lower $\epsilon_0$ or in order to lower tan $\delta_0$. If it exceeds 60%, glass tends to be unstable on the contrary. In the glass powder A2, each of MgO and CaO is essential, and in the glass powder A3, MgO is essential.

Each of SrO and BaO is not essential, but may be contained up to 20% in total, in order to lower the glass melt temperature, in order to lower $T_G$ or in order to lower tan $\delta_0$. If it exceeds 20%, devitrification is likely to take place, or $\epsilon_0$ tends to be high. In the glass powder A3, at least one of SrO and BaO is essential.

ZnO is not essential, but may be contained up to 30% in order to lower the glass melt temperature, in order to increase fluidity or in order to lower $T_G$. If it exceeds 30%, chemical durability, particularly acid resistance tends to decrease. It is preferably at most 10%.

Each of $Li_2O$, $Na_2O$ and $K_2O$ is not essential, but may be contained up to 10% in total, in order to increase fluidity or in order to lower $T_G$. If it exceeds 10%, tan $\delta_0$ tends to be high, or electrical insulating properties tend to be low. It is preferably at most 6%. In a case where the electrical insulating properties have to be high, or in a case where $SiO_2$ is at most 55%, none of them are preferably contained.

Each of $TiO_2$ and $ZrO_2$ is not essential, but may be contained up to 5% in total, in order to lower the glass melt temperature or in order to accelerate precipitation of crystals at the time of calcination. If it exceeds 5%, $\delta_0$ tends to be high, or glass tends to be unstable. It is preferably at most 3% in total, more preferably at most 2% in total.

$SnO_2$ is not essential, but may be contained up to 5% in order to increase chemical durability. If it exceeds 5%, $\epsilon_0$ tends to be high.

The glass powder A consists essentially of the above components, but may contain other components within a range of not impairing the object of the present invention. The total of contents of said other components is preferably at most 10%. If it exceeds 10%, devitrification is likely to take place. The total content is more preferably at most 5%. Here, none of lead, cadmium and arsenic are preferably contained.

Examples of said other components are as follows. Namely, e.g. $Bi_2O_3$, $P_2O_5$ or F may be contained in order to lower the glass melt temperature or for another purpose. Further, e.g. $Fe_2O_3$, MnO, CuO, CoO, $V_2O_5$ or $Cr_2O_3$ may be contained in order to color the glass or for another purpose.

The content of the low-melting glass powder is preferably from 40 to 90%. If it is less than 40%, sintering properties tend to be low. It is more preferably at least 45%. If it exceeds 90%, strength of the calcined product tends to be low. It is more preferably at most 85%.

The composition of the first invention consists essentially of the fire resisting powder and the low-melting glass powder, but may contain other components such as a heat resistant coloring pigment within a range of not impairing the object of the present invention. The total of contents of said other components is preferably at most 10%, more preferably at most 5%.

Now, the components of the glass ceramic composition according to the second invention (hereinafter referred to as the composition of the second invention) will be explained according to the explanation regarding the composition of the first invention. Explanation may be omitted in some cases regarding a part which overlaps with the explanation regarding the composition of the first invention.

The fire resisting powder is a component to increase strength of a calcined product and is essential. If it exceeds 58% as represented by mass percentage, sintering properties tend to decrease.

In a case where crystals are precipitated from the low-melting glass powder at the time of calcination, in a case where the average $L_{AV}$ of the major axes L of particles of the fire resisting powder is less than 0.5 µm or exceeds 15 µm, in a case where the average $\Psi_{AV}$ of the ratios L/W of the major axes L to the minor axes W of particles of the fire resisting powder exceeds 1.4, or the like, sintering properties tend to decrease, and in such a case, the content of the fire resisting powder is preferably at most 52%, more preferably at most 46%.

In a case not corresponding to the above cases where sintering properties tend to decrease, the content of the fire resisting powder is preferably at least 30%.

The fire resisting powder is preferably a powder of at least one type of an inorganic material selected from the group consisting of α-alumina, cordierite, forsterite, enstatite and spinel. It is more preferred that an α-alumina powder is contained.

The average $L_{AV}$ of the major axes L of particles of the fire resisting powder is preferably from 0.5 to 15 µm, and the average $\Psi_{AV}$ of the ratios L/W of the major axes L to the minor axes W is preferably at most 1.4.

$L_{AV}$ is more preferably at least 0.7 µm, particularly preferably at least 1 µm. Further, in e.g. a case where ε has to be further lower, it is more preferably at most 9 µm, particularly preferably at most 6 µm. Further, in a case where deformation such as warpage on the calcined product due to difference between the sintering shrinkage behaviors of the green sheet and the sintering shrinkage behaviors of the above conductor has to be more suppressed, $L_{AV}$ is preferably at least 9 µm.

$\Psi_{AV}$ is preferably at most 1.3, more preferably at most 1.25.

The ratio $D_{90}/D_{10}$ of the 90% particle diameter $D_{90}$ to the 10% particle diameter $D_{10}$ of the fire resisting powder is preferably at most 5. It is more preferably at most 3.

The low-melting glass powder is a component to improve denseness of the calcined product and is essential. If it exceeds 90% as represented by mass percentage, strength of the calcined product tends to decrease.

In a case corresponding to the above cases where the sintering properties tend to decrease, the content of the low-melting glass powder is preferably at least 48%, more preferably at least 54%.

In a case not corresponding to the above cases where the sintering properties tend to decrease, the content of the low-melting glass powder is preferably at most 70%.

The average particle diameter $D_{50}$ of the low-melting glass powder is preferably from 0.5 to 10 µm.

The glass transition point $T_G$ of the low-melting glass powder is preferably at most 760° C., more preferably at most 730° C. Further, $T_G$ is preferably at least 550° C.

The relative dielectric constant $\epsilon_0$ of a calcined product obtained by calcining the low-melting glass powder at 900° C., at 20° C. at 35 GHz is preferably at most 8. It is more preferably at most 7.5. Further, $\epsilon_0$ is typically at least 4. The time of holding the low-melting glass powder at 900° C. is typically from 30 to 60 minutes.

The dissipation loss tan $\delta_0$ of the above calcined product at 20° C. at 35 GHz is preferably at most 0.0070. It is more preferably at most 0.0055, particularly preferably at most 0.0030. Tan $\delta_0$ is typically at least 0.0010.

In a case where an electronic circuit board is prepared by employing the composition of the present invention, the preferred range of the average coefficient of linear expansion $\alpha_0$ of the above calcined product at from 50 to 350° C. varies depending upon the application of the electronic circuit board.

In a case where silicon is formed on the electronic circuit board, $\alpha_0$ is preferably from $30 \times 10^{-7}$ to $55 \times 10^{-7}$/° C.

In a case where gallium arsenide is formed on the electronic circuit board, $\alpha_0$ is preferably from $56 \times 10^{-7}$ to $83 \times 10^{-7}$/° C.

In a case where the electronic circuit board is joined with a circuit board made of a resin, it is preferably from $84 \times 10^{-7}$ to $130 \times 10^{-7}$/° C.

As described above, the low-melting glass powder consists essentially of $SiO_2$: 35 to 70%, $B_2O_3$: 0 to 30%, $Al_2O_3$: 3 to 18%, MgO: 0 to 40%, CaO: 0 to 19%, BaO: 0 to 35% and ZnO: 0 to 9% (glass powder B).

The glass powder B is included in the above glass powder A. Namely, the glass powder B may contain $Li_2O$, $Ni_2O$ and $K_2O$ in a total amount of at most 10%, $TiO_2$ and $ZrO_2$ in a total amount of at most 5%, and $SnO_2$ in an amount of at most 5%, although each of them is not essential.

It is preferred that the glass powder B contains substantially no $Li_2O$, $Na_2O$ nor $K_2O$. Even when the glass powder B contains $SnO_2$, its content is preferably at most 2%, and in a case where at least one of $TiO_2$, $ZrO_2$ and $SnO_2$ is contained, the total of their contents is preferably at most 5%.

With respect to the glass powder B, in a case where it is preferred that $\alpha_0$ is from $30 \times 10^{-7}$ to $55 \times 10^{-7}$/° C., and that no crystals are precipitated at the time of calcination, or their amount is small even if crystals are precipitated, the glass powder B preferably consists essentially of $SiO_2$: 60 to 70%, $B_2O_3$: 20 to 30%, $Al_2O_3$: 3 to 8%, MgO: 0 to 1%, CaO: 2 to 8%, BaO: 0 to 2% and ZnO: 0 to 2%, and $SiO_2+B_2O_3$ is from 86 to 93% and $SiO_2+B_2O_3+Al_2O_3+CaO$ exceeds 98% (glass powder B1).

The glass powder B1 is included in the above glass powder A1.

Here, in a case where no crystals are precipitated at the time of calcination, or their amount is small even if crystals are precipitated, improvement in dimensional accuracy of an electronic circuit board can be expected.

Of the glass powder B1, $\epsilon_0$ is typically from 3.8 to 4.8 and tan $\delta_0$ is from 0.0020 to 0.0030.

With respect to the glass powder B, in a case where it is preferred that $\alpha_0$ is from $66 \times 10^{-7}$ to $83 \times 10^{-7}/°$ C., and that crystals are precipitated at the time of calcination, the glass powder B preferably consists essentially of $SiO_2$: 35 to 53%, $B_2O_3$: 0 to 2%, $Al_2O_3$: 5 to 18%, MgO: 20 to 40%, CaO: over 7 to 19%, BaO: 0 to 3% and ZnO: 0 to 9%, and $SiO_2+Al_2O_3$ is at most 59%, and $Al_2O_3/(MgO+CaO)$ is at least 0.13 (glass powder B2).

The glass powder B2 is included in the above glass powder A2.

The glass powder B2 is preferably such that both anorthite and diopside are precipitated therefrom when it is held at 900° C. for 60 minutes and calcined. Anorthite has an effect of lowering $\alpha_0$. Diopside has effects of increasing $\alpha_0$ and lowering tan $\delta_0$.

In a case where crystals are precipitated at the time of calcination, improvement in strength of an electronic circuit board can be expected.

Of the glass powder B2, $\epsilon_0$ is typically from 6.5 to 7.4 and tan $\delta_0$ is from 0.0020 to 0.0058.

With respect to the glass powder B, in a case where it is preferred that $\alpha_0$ is from $30 \times 10^{-7}$ to $66 \times 10^{-7}/°$ C. and that crystals are precipitated at the time of calcination, the glass powder B preferably consists essentially of $SiO_2$: 48 to 60%, $B_2O_3$: 2 to 10%, $Al_2O_3$: 5 to 18%, MgO: 15 to 40%, CaO: 0.5 to 7%, BaO: 0 to 3% and ZnO: 0.5 to 9% (glass powder B3).

The glass powder B3 is included in the above glass powder A3.

Of the glass powder B3, $\epsilon_0$ is typically from 4.5 to 7.0 and tan $\delta_0$ is from 0.0020 to 0.0075.

The glass powder B3 is preferably such that cordierite is precipitated when it is held at 900° C. for 60 minutes and calcined. Cordierite has effects of lowering $\alpha_0$, lowering $\epsilon_0$ and lowering tan $\delta_0$.

With respect to the glass powder B, in a case where it is preferred that $\alpha_0$ is from $84 \times 10^{-7}$ to $110 \times 10^{-7}/°$ C., the glass powder B preferably consists essentially of $SiO_2$: 48 to 60%, $B_2O_3$: 0 to 10%, $Al_2O_3$: 9 to 18%, MgO: 0 to 5%, CaO: 0 to 5%, BaO: 25 to 35% and ZnO: 0 to 5% (glass powder B4).

Of the glass powder B4, $\epsilon_0$ is typically from 4.8 to 7.0 and tan $\delta_0$ is from 0.0020 to 0.0050.

The glass powder B4 is preferably such that $BaAl_2Si_2O_8$ crystals are precipitated therefrom when it is held at 900° C. for 60 minutes and calcined. The $BaAl_2Si_2O_8$ crystals have effects of increasing $\alpha_0$, lowering $\epsilon_0$ and lowering tan $\delta_0$.

Now, the composition of the above glass powder B will be explained.

$SiO_2$ is a network former and is essential. If it is less than 35%, $\epsilon_0$ tends to be high. If it exceeds 70%, the glass transition point $T_G$ tends to be high.

With respect to the glass powder B1, it is at least 60% in order to lower tan $\delta_0$. It is preferably at least 63%.

With respect to the glass powder B2, it is at most 53% in order that both anorthite and diopside are likely to be precipitated. It is preferably at most 46%.

With respect to the glass powders B3 and B4, it is at least 48% in order that crystals are likely to be precipitated. It is preferably at least 50%. Further, it is at most 60% in order to lower $T_G$. It is preferably at most 57%.

$B_2O_3$ is not essential, but may be contained up to 30% in order to increase fluidity or in order to lower $\epsilon_0$. If it exceeds 30%, chemical durability, particularly water resistance tends to decrease.

With respect to the glass powder B1, $B_2O_3$ is essential in order to lower $T_G$ or in order to lower $\epsilon_0$. It is preferably from 22 to 26%.

With respect to the glass powder B2, it is at most 2% in order to lower tan $\delta_0$. It is preferably at most 1.5%. In a case where $B_2O_3$ is contained, the content is preferably at least 0.5%.

With respect to the glass powder B3, $B_2O_3$ is essential in order to increase the fluidity. Further, it is at most 10% in order to lower tan $\delta_0$. It is preferably from 1 to 5%.

With respect to the glass powder B4, it is at most 10% in order to lower tan $\delta_0$. It is preferably at most 6%. In a case where $B_2O_3$ is contained, the content is preferably at least 0.5%.

$Al_2O_3$ has an effect of stabilizing glass and is essential. If it exceeds 18%, $T_G$ tends to be high.

With respect to the glass powder B1, it is at most 8% in order to lower $T_G$. It is preferably from 4 to 6%.

With respect to the glass powder B2, it is at least 5% in order to accelerate precipitation of anorthite. It is preferably from 7 to 12%.

With respect to the glass powder B3, it is at least 5% in order to accelerate crystal precipitation. It is preferably from 7 to 12%.

With respect to the glass powder B4, it is at least 9% in order to accelerate crystal precipitation. It is preferably from 9.5 to 12%.

MgO is not essential, but may be contained up to 40% in e.g. a case of accelerating crystal precipitation. If it exceeds 40%, glass tends to be unstable.

With respect to the glass powder B1, MgO may be contained up to 1%, but substantially no MgO is preferably contained.

With respect to the glass powder B2, it is at least 20% in order to accelerate precipitation of diopside. It is preferably from 25 to 33%.

With respect to the glass powder B3, it is at least 15% in order to accelerate precipitation of cordierite. It is preferably from 18 to 36%.

With respect to the glass powder B4, MgO may be contained up to 5%. If it exceeds 5%, $BaAl_2Si_2O_8$ crystals are less likely to be precipitated. It is preferably at most 3%.

CaO is not essential, but may be contained up to 19% in order to stabilize glass or for another purpose. If it exceeds 19%, glass tends to be unstable on the contrary.

With respect to the glass powder B1, it is at least 2% in order to stabilize glass. Further, it is at most 8% in order to stabilize glass also. It is preferably from 3 to 6%.

With respect to the glass powder B2, it exceeds 7% in order to accelerate precipitation of anorthite. It is preferably from 12 to 20%.

With respect to the glass powder B3, it is at least 0.5% in order to stabilize glass. Further, it is at most 7% in order to accelerate precipitation of cordierite. It is preferably from 1 to 6%.

With respect to the glass powder B4, CaO may be contained up to 5%. If it exceeds 5%, $BaAl_2Si_2O_8$ crystals are less likely to be precipitated. It is preferably at most 3%.

BaO is not essential, but may be contained up to 35% in a case of accelerating precipitation of $BaAl_2Si_2O_8$ crystals, in a case of lowering $T_G$ or in another case. If it exceeds 35%, glass tends to be unstable.

With respect to the glass powder B1, BaO may be contained up to 2%.

With respect to the glass powders B2 and B3, BaO may be contained up to 3%. If it exceeds 3%, $\epsilon_0$ tends to increase.

With respect to the glass powder B4, it is at least 25% in order to accelerate $BaAl_2Si_2O_8$ crystal precipitation. It is preferably from 28 to 33%.

ZnO is not essential, but may be contained up to 9% in order to increase the fluidity or for another purpose. If it exceeds 9%, tan $\delta_0$ tends to be high. It is preferably at most 7%.

With respect to the glass powder B1, ZnO may be contained up to 2%. It is preferably at most 1%.

With respect to the glass powder B3, it is at least 0.5 in order to increase fluidity. It is preferably from 2 to 7%.

With respect to the glass powder B4, ZnO may be contained up to 5%. If it exceeds 5%, devitrification is likely to take place. It is preferably at most 3%.

With respect to the glass powder B1, $SiO_2+B_2O_3$ is from 86 to 93%, and $SiO_2+B_2O_3+Al_2O_3+CaO$ exceeds 98%. If $SiO_2+B_2O_3$ is less than 86%, $\epsilon_0$ tends to be high. Further, it is preferred that none of $Li_2O$, $Na_2O$, $K_2O$ and $Sb_2O_3$ are contained.

With respect to the glass powder B2, $SiO_2+Al_2O_3$ is at most 59%, and $Al_2O_3/(MgO+CaO)$ is at least 0.13. If $SiO_2+Al_2O_3$ exceeds 59%, crystals are less likely to be precipitated. Further, if $Al_2O_3/(MgO+CaO)$ is less than 0.13, anorthite is less likely to be precipitated.

The glass powder B consists essentially of the above components, but may contain other components within a range of not impairing the object of the present invention. The total of contents of said other components is preferably at most 10%. If it exceeds 10%, devitrification is likely to take place. The total is more preferably at most 5%. None of lead, cadmium and arsenic are preferably contained.

As said other components, the following may be exemplified in addition to the above-mentioned $Li_2O$, $Na_2O$, $K_2O$, $SnO_2$, $TiO_2$ and $ZrO_2$. Namely, e.g. $Bi_2O_3$, $P_2O_5$ or F may be contained in order to lower the glass melt temperature or for another purpose. Further, e.g. $Fe_2O_3$, MnO, CuO, CoO, $V_2O_5$ or $Cr_2O_3$ may be contained in order to color the glass or for another purpose.

The composition of the second invention consists essentially of the fire resisting powder and the glass powder B, but may contain other components such as a heat resistant coloring pigment within a range of not impairing the object of the present invention. The total of contents of said other components is preferably at most 10%, more preferably at most 5%.

Starting materials were blended and mixed so that the composition would be as identified in columns "$SiO_2$" to "$K_2O$" in Table 1 as represented by mol %, and the mixed starting materials were put into a platinum crucible and melted at from 1,500 to 1,650° C. for 120 minutes, and the molten glass was drawn off and cooled. The obtained glass was pulverized by an alumina ball mill for 30 hours to obtain each of glass powders (G1 to G5).

With respect to each of the glass powders G1 to G5, $D_{50}$ (unit: μm), $T_G$(unit: °C.), crystallization temperature $T_c$ (unit: °C.), $\alpha_0$ (unit: $10^{-7}/°C.$), relative dielectric constant $\epsilon_0$, dissipation loss tan $\delta_0$ and precipitated crystals were measured as follows. The results are shown in Table 1.

$D_{50}$: measured by means of laser diffraction particle size analyzer SALD2100 manufactured by Shimadzu Corporation, employing water as a solvent.

$T_G$, $T_c$: measured by means of differential thermal analysis, employing an alumina powder as a standard substance, from room temperature to 1,000° C. at a temperature-raising rate of 10° C./min. The first exothermic peak temperature is taken as $T_c$, and $T_c=\infty$ with respect to one having no exothermic peak confirmed.

$\alpha_0$: the average coefficient of linear expansion at from 50 to 350° C. was measured by means of a differential thermal expansion meter DILATOMETER5000 manufactured by Mac Science Co., Ltd., employing quartz glass as a standard, with respect to 5 g of the glass powder subjected to pressure molding, calcined at 900° C. and formed into a diameter of 5 mm and a length of 20 mm.

$\epsilon_0$, tan $\delta_0$: 40 g of the glass powder was subjected to press molding into a shape of 60 mm×60 mm, which was held at 900° C. for 1 hour and calcined. The obtained calcined product was cut and ground, and the upper and lower surfaces are subjected to mirror polishing to prepare a sample having a thickness of 250 μm and a size of 50 mm×50 mm. With respect to this sample, the relative dielectric constant and the dissipation loss were measured at 20° C. at 35 GHz by means of cavity resonance method.

Precipitated crystals: a calcined product obtained by holding the glass powder at 900° C. for 1 hour for calcination was pulverized, and presence or absence of crystal precipitation was confirmed and identification of precipitated crystals was carried out by means of X-ray diffraction. "–" means that no crystal precipitation was confirmed, and "A" represents anorthite, "B" represents $BaAl_2Si_2O_8$ crystals, "C" represents cordierite, "D" represents diopside, and "F" represents forsterite.

On the other hand, four types of α-alumina powders i.e. Sumikorandom AA-07 (alumina AL1), Sumikorandom AA-2 (alumina AL2), Sumikorandom AA-10 (alumina AL3), each manufactured by Sumitomo Chemical Co., Ltd., and AL-45H (alumina AL4) manufactured by SHOWA DENKO K.K. were prepared.

Particles of each of alumina AL1, AL2, AL3 and AL4 were observed by a SEM as described above to measure L and W. The average $L_{AV}$ (unit: μm) of L and the average $\Psi_{AV}$ of L/W are shown in Table 2. With respect to AL1, observation was carried out under 10,000 magnifications, with respect to alumina AL2 and AL4, observation was carried out under 5,000 magnifications, and with respect to alumina AL3, observation was carried out under 2,000 magnifications.

Further, with respect to alumina AL1 to AL4, the particle size distribution (represented by mass percentage) was measured by means of laser diffraction particle size analyzer SALD2100 manufactured by Shimadzu Corporation employing water as a solvent. The results are shown in Table 3 together with the 90% particle diameter $D_{90}$ (unit: μm), the 10% particle diameter $D_{10}$ (unit: μm) and the ratio thereof $D_{90}/D_{10}$.

Then, a glass powder and an α-alumina powder as identified in the columns "type of glass" and "type of alumina", respectively, in Table 4, were mixed in a proportion as identified in columns "glass" and "alumina" in Table 4 as represented by mass percentage. The obtained mixed powder was mixed with an organic solvent (mixture comprising toluene and isopropyl alcohol in a mass ratio of 3:1), a plasticizer (di-2-ethylhexyl phthalate) and a resin (polyvinyl butyral PVK#3000k manufactured by Denki Kagaku Kogyo K.K.). The above organic solvent was optionally added to the mixture to adjust the viscosity, which was coated on a PET film by means of doctor blade method, followed by drying to prepare a green sheet.

The obtained green sheet was cut into 50 mm×50 mm, and 12 sheets thereof were laminated one on another, followed by pressing under 20 MPa for 1 minute. This pressed product was held at 550° C. for 5 hours to decompose and remove resin components, followed by calcination by holding the pressed product at 900° C. for 1 hour to obtain a calcined product.

With respect to the obtained calcined product, sintering properties, $\epsilon$, tan $\delta$ and flexural strength (unit: MPa) were evaluated or measured as follows. Examples 1 to 8 are Examples of the present invention, and Example 9 is a Comparative Example. In Example 9, no dense calcined product could be obtained, and $\epsilon$, tan $\delta$ and flexural strength were not measured.

Sintering properties: the calcined product was immersed in a red soakage (Super Check UP-G3 manufactured by Marktec Corporation) and washed with water, and whether the calcined product was reddened or not was observed. "○" represents a case where the calcined product was not reddened, and "X" represents a case where the calcined product was reddened.

$\epsilon$, tan $\delta$: a sample was prepared and measurement was carried out in the same manner as in measurement of $\epsilon_0$ and tan $\delta_0$.

Flexural strength: the calcined product was cut into 4 mm×20 mm, the surface was finished with #1000 $Si_3N_4$ abrasive, and three-point flexural strength was measured at a cross head speed of 0.5 mm/min in a span of 15 mm. The average of results of five measurements was taken as the flexural strength. The flexural strength is preferably at least 150 MPa, more preferably at least 200 MPa.

Further, in Examples 2 and 8, the transmission loss S21 (unit: dB/mm) at 20° C. at 40 GHz was measured as described above.

TABLE 3

|  | AL1 | AL2 | AL3 | AL4 |
|---|---|---|---|---|
| 19.11 μm | 100 | 100 | 100 | 100 |
| 12.60 μm | 100 | 100 | 73.95 | 100 |
| 8.31 μm | 100 | 100 | 10.57 | 100 |
| 5.48 μm | 100 | 98.60 | 0 | 87.67 |
| 3.61 μm | 100 | 79.75 | 0 | 65.06 |
| 2.38 μm | 100 | 37.89 | 0 | 41.20 |
| 1.57 μm | 75.79 | 7.12 | 0 | 25.29 |
| 1.04 μm | 30.57 | 5.95 | 0 | 18.88 |
| 0.68 μm | 2.26 | 5.95 | 0 | 13.44 |
| 0.45 μm | 0 | 2.56 | 0 | 8.35 |
| 0.30 μm | 0 | 0 | 0 | 5.64 |
| 0.20 μm | 0 | 0 | 0 | 3.84 |
| 0.13 μm | 0 | 0 | 0 | 1.71 |
| $D_{90}$ | 1.86 | 4.28 | 14.74 | 5.80 |
| $D_{10}$ | 0.80 | 1.66 | 8.22 | 0.52 |
| $D_{90}/D_{10}$ | 2.33 | 2.58 | 1.79 | 11.15 |

TABLE 4

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Type of glass | G1 | G2 | G2 | G2 | G2 | G3 | G4 | G5 | G1 |
| Type of alumina | AL2 | AL2 | AL1 | AL3 | AL4 | AL4 | AL1 | AL2 | AL4 |
| Glass | 50 | 60 | 80 | 80 | 80 | 80 | 80 | 50 | 40 |
| Alumina | 50 | 40 | 20 | 20 | 20 | 20 | 20 | 50 | 60 |
| Sintering properties | ○ | ○ | ○ | ○ | ○ | ○ | ○ | ○ | X |
| $\epsilon$ | 5.8 | 7.5 | 7.3 | 8.6 | 7.7 | 6.6 | 6.5 | 5.4 | — |
| tan$\delta$ | 0.0015 | 0.0013 | 0.0019 | 0.0019 | 0.0036 | 0.0031 | 0.0019 | 0.0049 | — |
| Flexural strength | 240 | 300 | 242 | 230 | 276 | 210 | 200 | 180 | — |
| S21 | — | 0.047 | — | — | — | — | — | 0.073 | — |

TABLE 1

|  | G1 | G2 | G3 | G4 | G5 |
|---|---|---|---|---|---|
| $SiO_2$ | 65 | 44 | 53 | 55 | 75 |
| $B_2O_3$ | 25 | 0 | 3 | 5 | 21 |
| $Al_2O_3$ | 5 | 8 | 12 | 10 | 0 |
| MgO | 0 | 30 | 22 | 0 | 0 |
| CaO | 5 | 16 | 5 | 0 | 0 |
| BaO | 0 | 0 | 0 | 30 | 0 |
| ZnO | 0 | 2 | 5 | 0 | 0 |
| $K_2O$ | 0 | 0 | 0 | 0 | 4 |
| $D_{50}$ | 2.5 | 2.5 | 3.1 | 4.5 | 2.4 |
| $T_G$ | 600 | 720 | 700 | 680 | 490 |
| $T_C$ | ∞ | 948 | 985 | 956 | ∞ |
| $\alpha_0$ | 32 | 76 | 48 | 94 | 29 |
| $\epsilon_0$ | 4.3 | 6.7 | 6.2 | 6.0 | 4.5 |
| tan$\delta_0$ | 0.0022 | 0.0052 | 0.0036 | 0.0025 | 0.0040 |
| Precipitated crystals | — | A, D, F | C, F | B | — |

TABLE 2

|  | AL1 | AL2 | AL3 | AL4 |
|---|---|---|---|---|
| $L_{AV}$ | 0.87 | 1.93 | 9.73 | 2.94 |
| $\Psi_{AV}$ | 1.21 | 1.22 | 1.31 | 1.57 |

INDUSTRIAL APPLICABILITY

According to the present invention, a sintered product suitable for an electronic circuit board can be obtained by calcination at a temperature of 900° C. or below. Further, a sintered product having low $\epsilon$ and tan $\delta$ and having high strength can be obtained. Further, a calcined product having a small transmission loss S21 can be obtained.

The entire disclosure of Japanese Patent Application No. 2001-339575 filed on Nov. 5, 2001 including specification, claims and summary is incorporated herein by reference in its entirety.

What is claimed is:

1. A glass ceramic composition which consists essentially of an inorganic material powder having a melting point or a glass transition point of at least 1,000° C. and a glass powder having a glass transition point of from 450 to 800° C., wherein the average of the major axes L of particles of the above inorganic material powder is from 0.5 to 15 μm, and the average of the ratios L/W of the major axes L to the minor axes W is at most 1.4.

2. The glass ceramic composition according to claim 1, wherein the ratio $D_{90}/D_{10}$ of the 90% particle diameter $D_{90}$ to the 10% particle diameter $D_{10}$ of the above inorganic material powder is at most 5.

3. The glass ceramic composition according to claim 1, wherein the content of the inorganic material powder is from 10 to 60%, and the content of the glass powder is from 40 to 90%, as represented by mass percentage.

4. The glass ceramic composition according to claim 1, wherein the inorganic material powder is a powder of at least one inorganic material selected from the group consisting of α-alumina, cordierite, forsterite, enstatite and spinel.

5. The glass ceramic composition according to claim 1, wherein the glass powder consists essentially of, as represented by mol % based on the following oxides:

| | |
|---|---|
| $SiO_2$ | 20 to 72%, |
| $B_2O_3$ | 0 to 30%, |
| $Al_2O_3$ | 0 to 20%, |
| MgO + CaO | 0 to 60%, |
| SrO + BaO | 0 to 20%, |
| ZnO | 0 to 30%, |
| $Li_2O + Na_2O + K_2O$ | 0 to 10%, |
| $TiO_2 + ZrO_2$ | 0 to 5%, and |
| $SnO_2$ | 0 to 5%, | and $SiO_2+B_2O_3$ is at least 30%.

6. A glass ceramic composition which consists essentially of, as represented by mass percentage, from 10 to 58% of an inorganic material powder having a melting point or a glass transition point of at least 1,000° C. and from 42 to 90% of a glass powder having a glass transition point of from 450 to 800° C., wherein the glass powder consists essentially of, as represented by mol % based on the following oxides, $SiO_2$: 60 to 70%, $B_2O_3$: 20 to 30%, $Al_2O_3$: 3 to 8%, MgO: 0 to 1%, CaO: 2 to 8%, BaO: 0 to 2% and ZnO: 0 to 2%, and $SiO_2+B_2O_3$ is from 86 to 93%, and $SiO_2+B_2O_3+Al_2O_3+CaO$ exceeds 98%.

7. The glass ceramic composition according to claim 6, wherein the ratio $D_{90}/D_{10}$ of the 90% particle diameter $D_{90}$ to the 10% particle diameter $D_{10}$ of the above inorganic material powder is at most 5.

8. The glass ceramic composition according to claim 6, wherein the inorganic material powder is a powder of at least one inorganic material selected from the group consisting of α-alumina, cordierite, forsterite, enstatite and spinel.

9. The glass ceramic composition according to claim 6, wherein the average of the major axes L of particles of the above inorganic material powder is from 0.5 to 15 μm, and the average of the ratios L/W of the major axes L to the minor axes W is at most 1.4.

10. A glass ceramic composition which consists essentially of, as represented by mass percentage, from 10 to 58% of an inorganic material powder having a melting point or a glass transition point of at least 1,000° C. and from 42 to 90% of a glass powder having a glass transition point of from 450 to 800° C., wherein the glass powder consists essentially of, as represented by mol % based on the following oxides, $SiO_2$: 35 to 53%, $B_2O_3$: 0 to 2%, $Al_2O_3$: 5 to 18%, MgO: 20 to 40%, CaO: over 7 to 19%, BaO: 0 to 3% and ZnO: 0 to 9%, and $SiO_2+Al_2O_3$ is at most 59%, and $Al_2O_3/(MgO+CaO)$ is at least 0.13.

11. The glass ceramic composition according to claim 10, wherein the ratio $D_{90}/D_{10}$ of the 90% particle diameter $D_{90}$ to the 10% particle diameter $D_{10}$ of the above inorganic material powder is at most 5.

12. The glass ceramic composition according to claim 10, wherein the inorganic material powder is a powder of at least one inorganic material selected from the group consisting of α-alumina, cordierite, forsterite, enstatite and spinel.

13. The glass ceramic composition according to claim 10, wherein the average of the major axes L of particles of the above inorganic material powder is from 0.5 to 15 μm, and the average of the ratios L/W of the major axes L to the minor axes W is at most 1.4.

14. A glass ceramic composition which consists essentially of, as represented by mass percentage, from 10 to 58% of an inorganic material powder having a melting point or a glass transition point of at least 1,000° C. and from 42 to 90% of a glass powder having a glass transition point of from 450 to 800° C., wherein the glass powder consists essentially of, as represented by mol % based on the following oxides, $SiO_2$: 48 to 60%, $B_2O_3$: 2 to 10%, $Al_2O_3$: 5 to 18%, MgO: 15 to 40%, CaO: 0.5 to 7%, BaO: 0 to 3% and ZnO: 0.5 to 9%.

15. The glass ceramic composition according to claim 14, wherein the ratio $D_{90}/D_{10}$ of the 90% particle diameter $D_{90}$ to the 10% particle diameter $D_{10}$ of the above inorganic material powder is at most 5.

16. The glass ceramic composition according to claim 14, wherein the inorganic material powder is a powder of at least one inorganic material selected from the group consisting of α-alumina, cordierite, forsterite, enstatite and spinel.

17. The glass ceramic composition according to claim 14, wherein the average of the major axes L of particles of the above inorganic material powder is from 0.5 to 15 μm, and the average of the ratios L/W of the major axes L to the minor axes W is at most 1.4.

18. A glass ceramic composition which consists essentially of, as represented by mass percentage, from 10 to 58% of an inorganic material powder having a melting point or a glass transition point of at least 1,000° C. and from 42 to 90% of a glass powder having a glass transition point of from 450 to 800° C., wherein the glass powder consists essentially of, as represented by mol % based on the following oxides, $SiO_2$: 48 to 60%, $B_2O_3$: 0 to 10%, $Al_2O_3$: 9 to 18%, MgO: 0 to 5%, CaO: 0 to 5%, BaO: 25 to 35%, and ZnO: 0 to 5%.

19. The glass ceramic composition according to claim 18, wherein the ratio $D_{90}/D_{10}$ of the 90% particle diameter $D_{90}$ to the 10% particle diameter $D_{10}$ of the above inorganic material powder is at most 5.

20. The glass ceramic composition according to claim 18, wherein the inorganic material powder is a powder of at least one inorganic material selected from the group consisting of α-alumina, cordierite, forsterite, enstatite and spinel.

21. The glass ceramic composition according to claim 18, wherein the average of the major axes L of particles of the above inorganic material powder is from 0.5 to 15 μm, and the average of the ratios L/W of the major axes L to the minor axes W is at most 1.4.

22. A glass ceramic composition which consists essentially of, as represented by mass percentage, from 10 to 58% of an inorganic material powder having a melting point or a glass transition point of at least 1,000° C. and from 42 to 90% of a glass powder having a glass transition point of from 450 to 800° C., wherein the glass powder consists essentially of, as represented by mol % based on the following oxides, $SiO_2$: 35 to 70%, $B_2O_3$: 0 to 30%, $Al_2O_3$: 3 to 18%, MgO: 0 to 40%, CaO: 0 to 19%, BaO: 0 to 35% and ZnO: 0 to 9%; and the ratio $D_{90}/D_{10}$ of the 90% particle diameter $D_{90}$ to the 10% particle diameter $D_{10}$ of the above inorganic material powder is at most 5.

23. A glass ceramic composition which consists essentially of, as represented by mass percentage, from 10 to 58% of an inorganic material powder having a melting point or a glass transition point of at least 1,000° C. and from 42 to 90% of a glass powder having a glass transition point of from 450 to 800° C., wherein the glass powder consists essentially of, as represented by mol % based on the following oxides, $SiO_2$: 35 to 70%, $B_2O_3$: 0 to 30%, $Al_2O_3$: 3 to 18%, MgO: 0 to 40%, CaO: 0 to 19%, BaO: 0 to 35% and ZnO: 0 to 9%; and the average of the major axes L of particles of the above inorganic material powder is from 0.5 to 15 μm, and the average of the ratios L/W of the major axes L to the minor axes W is at most 1.4.

* * * * *